(12) United States Patent
Cho et al.

(10) Patent No.: US 9,870,601 B2
(45) Date of Patent: Jan. 16, 2018

(54) SYSTEM AND METHOD FOR DISPLAYING PANORAMIC IMAGE USING SINGLE LOOK-UP TABLE

(71) Applicants: Electronics and Telecommunications Research Institute, Daejeon (KR); National University of Sciences & Technology, Islamabad (PK)

(72) Inventors: Yong Ju Cho, Daejeon (KR); Joo Myoung Seok, Daejeon (KR); Sang Woo Ahn, Daejeon (KR); Ji Hun Cha, Daejeon (KR); Arshad Ali, Islamabad (PK); Muhammad Murtaza, Islamabad (PK); Rehan Hafiz, Islamabad (PK); Ashar Rasul, Islamabad (PK); Saleh Saeed, Islamabad (PK); Muhammad Umer Kakli, Islamabad (PK)

(73) Assignees: Electronics and Telecommunications Research Institute, Daejeon (KR); National University of Sciences & Technology, Islamabad (PK)

( * ) Notice: Subject to any disclaimer, the term of this patent is extended or adjusted under 35 U.S.C. 154(b) by 63 days.

(21) Appl. No.: 15/089,993

(22) Filed: Apr. 4, 2016

(65) Prior Publication Data
US 2016/0292821 A1     Oct. 6, 2016

(30) Foreign Application Priority Data
Apr. 3, 2015 (KR) .................. 10-2015-0047735

(51) Int. Cl.
*G06K 9/32* (2006.01)
*G06T 3/40* (2006.01)
(Continued)

(52) U.S. Cl.
CPC .............. *G06T 3/4038* (2013.01); *G06T 7/33* (2017.01); *G06T 7/38* (2017.01); *G06T 2207/10016* (2013.01)

(58) Field of Classification Search
None
See application file for complete search history.

(56) References Cited

U.S. PATENT DOCUMENTS 5,130,794 A    7/1992  Ritchey
5,881,211 A *  3/1999  Matsumura .......... H04N 1/6025
                                                  358/1.5
(Continued)

FOREIGN PATENT DOCUMENTS

WO     03027766 A2    4/2003
WO   2009055913 A1    5/2009
WO   2012056437 A1    5/2012

OTHER PUBLICATIONS

Phillipe Colantoni et al., "Analysis of Multispectral Images of Paintings," 14th European Signal Processing Conference (EUSIPCO 2006), Sep. 4-8, 2006, pp. 1-5, Florence, Italy. EURASIP.

(Continued)

*Primary Examiner* — Jayesh A Patel
(74) *Attorney, Agent, or Firm* — William Park & Associates Ltd.

(57) ABSTRACT

An apparatus and a method for displaying a panoramic image using a look-up table (LUT) are disclosed, including generating an LUT may include determining first geometric correction information to transform an input domain pixel coordinate system of an input image to a panorama domain pixel coordinate system of a panoramic image, determining second geometric correction information to transform an output domain pixel coordinate system of an output image of the panoramic image to the panorama domain pixel coordinate.

(Continued)

nate system of the panoramic image, determining third geometric correction information to transform the output domain pixel coordinate system of the output image to the input domain pixel coordinate system of the input image based on the first geometric correction information and second geometric correction information, and generating an LUT that maps the output domain pixel coordinate system of the output image to the input domain pixel coordinate system of the input image.

14 Claims, 11 Drawing Sheets

(51) Int. Cl.
*G06T 7/33* (2017.01)
*G06T 7/38* (2017.01)

(56) References Cited

U.S. PATENT DOCUMENTS

| | | | | |
|---|---|---|---|---|
| 6,058,208 A * | 5/2000 | Ikeda | ............... | H04N 1/622 358/518 |
| 6,075,905 A * | 6/2000 | Herman | ............... | G06K 9/32 348/588 |
| 6,078,701 A * | 6/2000 | Hsu | ............... | G06K 9/32 375/E7.086 |
| 6,173,087 B1 * | 1/2001 | Kumar | ............... | G06K 9/32 375/E7.086 |
| 6,359,617 B1 * | 3/2002 | Xiong | ............... | G06T 3/0068 715/848 |
| 6,434,265 B1 * | 8/2002 | Xiong | ............... | G06K 9/32 382/154 |
| 6,434,280 B1 * | 8/2002 | Peleg | ............... | G06T 3/4038 345/428 |
| 6,788,828 B2 * | 9/2004 | Katayama | ............... | G06T 3/4038 348/36 |
| 7,006,706 B2 * | 2/2006 | Sobel | ............... | G06K 9/32 345/629 |
| 7,046,401 B2 | 5/2006 | Dufaux et al. | | |
| 7,317,558 B2 * | 1/2008 | Chiba | ............... | H04N 1/3876 345/629 |
| 7,414,595 B1 * | 8/2008 | Muffler | ............... | G02B 27/1066 345/32 |
| 7,532,766 B2 * | 5/2009 | Chauville | ............... | G06T 1/0007 382/254 |
| 7,840,067 B2 | 11/2010 | Shen et al. | | |
| 7,843,465 B1 * | 11/2010 | Shaick | ............... | G09G 5/02 345/427 |
| 7,881,559 B2 * | 2/2011 | Park | ............... | G06K 9/36 345/629 |
| 8,041,144 B2 * | 10/2011 | Kim | ............... | H04N 1/407 345/204 |
| 8,045,796 B2 * | 10/2011 | Matsuoka | ............... | H04N 1/6052 345/600 |
| 8,073,259 B1 * | 12/2011 | Jin | ............... | G06K 9/6211 382/190 |
| 8,194,993 B1 * | 6/2012 | Chen | ............... | G06T 5/006 348/231.6 |
| 8,275,217 B2 * | 9/2012 | Kube | ............... | G06T 7/33 378/38 |
| 8,325,247 B2 | 12/2012 | Kamiya et al. | | |
| 8,351,740 B2 * | 1/2013 | Pham | ............... | G06K 9/32 382/205 |
| 8,630,031 B1 * | 1/2014 | Keithley | ............... | H04N 1/60 358/1.9 |
| 8,896,662 B2 | 11/2014 | Jones | | |
| 9,098,910 B2 * | 8/2015 | Hinkel | ............... | G06T 3/0062 |
| 9,210,310 B2 * | 12/2015 | Liu | ............... | H04N 5/2253 |
| 9,307,216 B2 * | 4/2016 | Nakamura | ............... | H04N 9/73 |
| 9,613,408 B2 * | 4/2017 | Micovic | ............... | G06T 5/009 |
| 2002/0041717 A1 * | 4/2002 | Murata | ............... | G06T 5/006 382/275 |
| 2003/0133020 A1 * | 7/2003 | Suh | ............... | G06T 3/4038 348/218.1 |
| 2003/0164826 A1 * | 9/2003 | Lavelle | ............... | G06T 5/002 345/419 |
| 2005/0275911 A1 * | 12/2005 | Yamada | ............... | H04N 1/60 358/518 |
| 2006/0050074 A1 * | 3/2006 | Bassi | ............... | G06T 3/0006 345/427 |
| 2007/0019884 A1 * | 1/2007 | Jojic | ............... | G06T 7/215 382/284 |
| 2008/0247667 A1 * | 10/2008 | Jin | ............... | G06T 3/4038 382/284 |
| 2009/0066726 A1 * | 3/2009 | Kato | ............... | B60R 1/00 345/639 |
| 2010/0033553 A1 | 2/2010 | Levy | | |
| 2010/0039562 A1 * | 2/2010 | Yang | ............... | G06F 3/1423 348/655 |
| 2010/0054628 A1 * | 3/2010 | Levy | ............... | G06T 3/4038 382/284 |
| 2010/0150406 A1 * | 6/2010 | Xiao | ............... | G06K 9/00261 382/118 |
| 2011/0200271 A1 * | 8/2011 | Shoaib | ............... | G06T 3/0018 382/276 |
| 2012/0149432 A1 | 6/2012 | Lablans | | |
| 2012/0169842 A1 * | 7/2012 | Chuang | ............... | G08B 13/19619 348/39 |
| 2013/0194292 A1 * | 8/2013 | Cho | ............... | H04N 9/3147 345/602 |
| 2014/0071228 A1 * | 3/2014 | Cho | ............... | H04N 5/23238 348/36 |
| 2014/0240452 A1 | 8/2014 | Ki et al. | | |
| 2017/0093571 A1 * | 3/2017 | Satpathy | ............... | H04L 9/10 |

OTHER PUBLICATIONS

"Generating Panoramic Views by Stitching Multiple Fisheye Images," Altera Corporation, May 2009, pp. 1-9.
J. Javier Yebes et al., "Surrounding View for Enhancing Safety on Vehicles," Proceedings of the 2012 IEEE Intelligent Vehicles Symposium Workshops, 2012, pp. 1-6.

* cited by examiner

Case 1

Case 2

SYSTEM AND METHOD FOR DISPLAYING PANORAMIC IMAGE USING SINGLE LOOK-UP TABLE

CROSS-REFERENCE TO RELATED APPLICATION

This application claims the priority benefit of Korean Patent Application No. 10-2015-0047735, filed on Apr. 3, 2015, in the Korean Intellectual Property Office, the disclosure of which is incorporated herein by reference.

BACKGROUND

1. Field of the Invention

Embodiments relate to an apparatus for outputting a look-up table (LUT) that maps an input domain pixel coordinate system of an input image to an output domain pixel coordinate system of an output image, and an apparatus and a method for displaying a panoramic image using an output LUT.

2. Description of the Related Art

A method of displaying a panoramic image may spatially stitch input images obtained by capturing a target space which is divided into areas using a plurality of cameras and may thus provide a broad angle of view greater than an angle of human view.

Here, geometric correction may need to be performed on the input images obtained through the cameras to generate a seamless panoramic image. When generating a panoramic image using a plurality of high-resolution input images, a panoramic image may not be readily generated in real time due to a time used for large-scale image processing.

In addition, when displaying a panoramic image through a plurality of monitors or beam projectors, a geometrical change may occur in a panoramic image during the displaying. Thus, geometric correction may also be necessary to display a seamless panoramic image through the monitors or the beam projectors.

However, when displaying the panoramic image generated using the input images through the monitors or the beam projectors, simultaneously performing both the geometric correction on the input images for generating the panoramic image and the geometric correction for displaying the panoramic image may be necessary, and thus an amount of an operation or a computation used for image processing may increase and the panoramic image may not be displayed in real time.

Thus, there is a desire for a method of minimizing an operation used for geometric correction on input images for generating a panoramic image and geometric correction for displaying the panoramic image.

SUMMARY

An aspect provides an apparatus and a method that may simultaneously process geometric transformation occurring in a process of generating a panoramic image by stitching input images and geometric transformation occurring in a process of displaying the panoramic image through a display device.

Another aspect also provides an apparatus and a method that may minimize an image processing operation used to display a panoramic image.

According to an aspect, there is provided a method of generating a look-up table (LUT), the method including determining first geometric correction information to transform an input domain pixel coordinate system of an input image to a panorama domain pixel coordinate system of a panoramic image in which a neighboring input image is connected to the input image, determining second geometric correction information to transform an output domain pixel coordinate system of an output image of the panoramic image output through a plurality of display devices to the panorama domain pixel coordinate system of the panoramic image, determining third geometric correction information to transform the output domain pixel coordinate system of the output image to the input domain pixel coordinate system of the input image based on the first geometric correction information and the second geometric correction information, and generating an LUT that maps the output domain pixel coordinate system of the output image to the input domain pixel coordinate system of the input image based on the third geometric correction information.

The determining of the third geometric correction information may include determining the third geometric correction information by combining inversely transformed first geometric correction information and the second geometric correction information.

The determining of the second geometric correction information may include setting the output domain pixel coordinate system of the output image to be the panorama domain pixel coordinate system of the panoramic image, in response to the display devices corresponding to a multi-panel environment.

The generating of the LUT may include determining an input domain pixel coordinate system of an input image corresponding to an output domain pixel coordinate system of an output image using at least one of Bezier correction, a homography matrix among cameras capturing the input image, a homography matrix between output domain pixel coordinates the output image and panorama domain pixel coordinates of a panoramic image, and rotational transformation, and generating the LUT by mapping the determined input domain pixel coordinate system of the input image to the output domain pixel coordinate system of the output image.

According to another aspect, there is provided a method of outputting a panoramic image, the method including applying, to an input image, a first blending mask determined based on an overlapping area between the input image and another input image in a panoramic image in which the input image is connected to the another input image, transforming, to an output image, the input image to which the first blending mask is applied using an LUT that maps an input domain pixel coordinate system of the input image to an output domain pixel coordinate system of an output image output through a plurality of display devices, applying, to the output image, a second blending mask determined based on an overlapping area in the panoramic image output through the display devices, and outputting the output image to which the second blending mask is applied.

The method may further include applying a color correction parameter to the input image to which the first blending mask is applied. The transforming may include transforming, to the output image, the input image to which the color correction parameter is applied using the LUT.

The LUT may be generated based on third geometric correction information to transform the output domain pixel coordinate system of the output image to the input domain pixel coordinate system of the input image.

The third geometric correction information may be generated based on first geometric correction information to transform the input domain pixel coordinate system of the input image to a panorama domain pixel coordinate system of the panoramic image and on second geometric correction information to transform the output domain pixel coordinate system of the output image to the panorama domain pixel coordinate system of the panoramic image.

In response to the display devices corresponding to a multi-panel environment, the second geometric correction information may be used to correct the output domain pixel coordinate system of the output image to be identical to the panorama domain pixel coordinate system of the panoramic image.

The LUT may be generated by mapping, to the output domain pixel coordinate system of the output image, an input domain pixel coordinate system of an input image determined using at least one of Bezier correction, a homography matrix among cameras capturing the input image, a homography matrix between output domain pixel coordinates of the output image and panorama domain pixel coordinates of the panoramic image, and rotational transformation.

According to still another aspect, there is provided an apparatus for generating an LUT, the apparatus including a processor configured to determine third geometric correction information to transform an output domain pixel coordinate system of an output image to an input domain pixel coordinate system of an input image based on first geometric correction information to transform the input domain pixel coordinate system of the input image to a panorama domain pixel coordinate system of a panoramic image in which a neighboring input image is connected to the input image and on second geometric correction information to transform the output domain pixel coordinate system of the output image of the panoramic image output through a plurality of display devices to the panorama domain pixel coordinate system of the panoramic image, and generate an LUT that maps the output domain pixel coordinate system of the output image to the input domain pixel coordinate system of the input image based on the third geometric correction information.

The processor may determine the third geometric correction information by combining inversely transformed first geometric correction information and the second geometric correction information.

In response to the display devices corresponding to a multi-panel environment, the processor may determine the second geometric correction information to set the output domain pixel coordinate system of the output image to be the panorama domain pixel coordinate system of the panoramic image.

The processor may generate the LUT by determining an input domain pixel coordinate system of an input image corresponding to an output domain pixel coordinate system of an output image using at least one of Bezier correction, a homography matrix among cameras capturing the input image, a homography matrix between output domain pixel coordinates of the output image and panorama domain pixel coordinates of the panoramic image, and rotational transformation, and by mapping the determined input domain pixel coordinate system of the input image to the output domain pixel coordinate system of the output image.

According to yet another aspect, there is provided an apparatus for outputting a panoramic image, the apparatus including a processor configured to apply, to an input image, a first blending mask determined based on an overlapping area between the input image and another input image in a panoramic image in which the input image is connected to the another input image, transform, to an output image, the input image to which the first blending mask is applied using an LUT that maps an input domain pixel coordinate system of the input image to an output domain pixel coordinate system of an output image output through a plurality of display devices, and apply, to the output image, a second blending mask determined based on an overlapping area in the panoramic image output through the display devices, and a transmitter configured to transmit, to the display devices, the output image to which the second blending mask is applied and allow the display devices to display the output image.

The processor may apply a color correction parameter to the input image to which the first blending mask is applied, and transform, to the output image, the input image to which the color correction parameter is applied using the LUT.

The LUT may be generated based on third geometric correction information to transform the output domain pixel coordinate system of the output image to the input domain pixel coordinate system of the input image.

The third geometric correction information may be generated based on first geometric correction information to transform the input domain pixel coordinate system of the input image to a panorama domain pixel coordinate system of the panoramic image and on second geometric correction information to transform the output domain pixel coordinate system of the output image to the panorama domain pixel coordinate system of the panoramic image.

In response to the display devices corresponding to a multi-panel environment, the second geometric correction information may be used to correct the output domain pixel coordinate system of the output image to be identical to the panorama domain pixel coordinate system of the panoramic image.

The LUT may be generated by mapping, to the output domain pixel coordinate system of the output image, an input domain pixel coordinate system of an input image determined using at least one of Bezier correction, a homography matrix among cameras capturing the input image, a homography matrix between output domain pixel coordinates of the output image and panorama domain pixel coordinates of the panoramic image, and rotational transformation.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
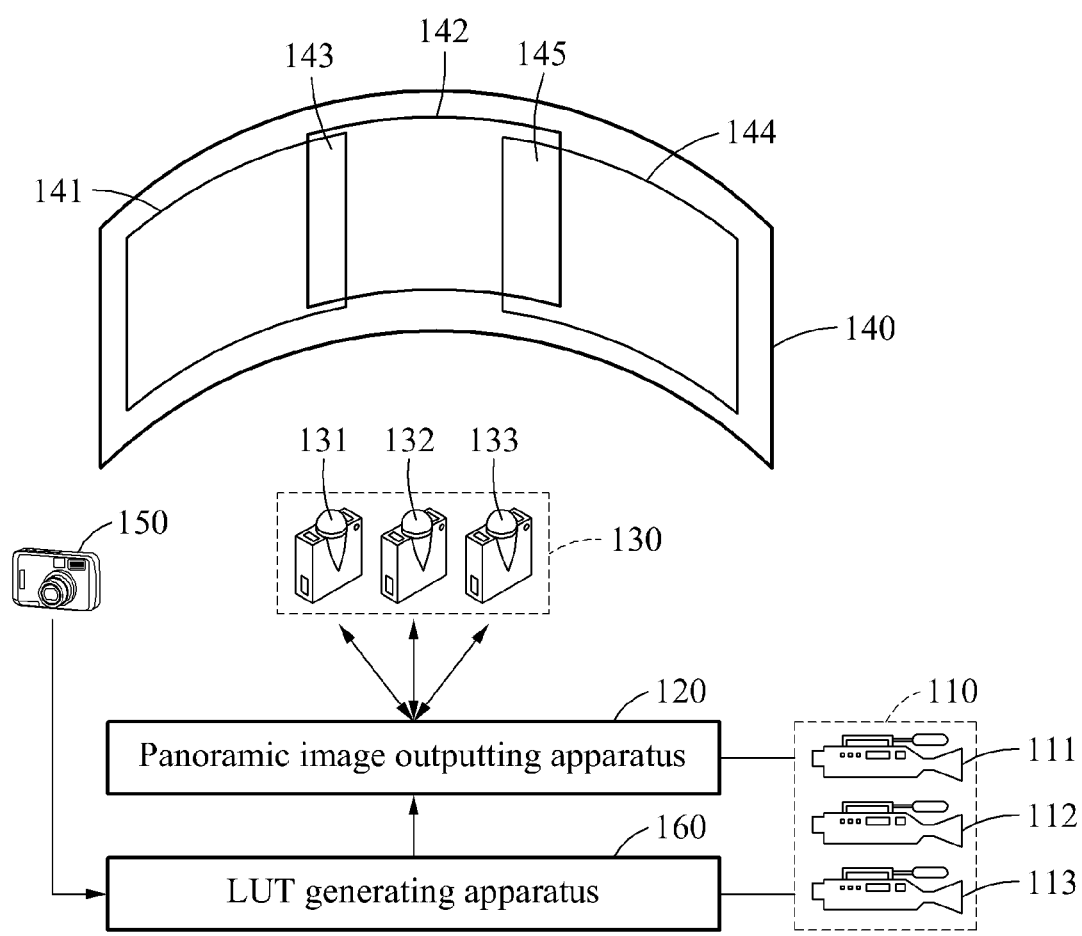
FIG. 1 is a diagram illustrating a system for outputting a panoramic image according to an embodiment.

Reference will now be made in detail to embodiments of the present invention, examples of which are illustrated in the accompanying drawings, wherein like reference numerals refer to the like elements throughout. Embodiments are described below to explain the present invention by referring to the figures.

A method of generating a look-up table (LUT) (hereinafter simply referred to as an LUT generating method) and a method of outputting a panoramic image (hereinafter simply referred to as a panoramic image outputting method) may be performed by an apparatus for generating an LUT (hereinafter simply referred to as an LUT generating apparatus) and by an apparatus for outputting a panoramic image (hereinafter simply referred to as a panoramic image outputting apparatus), respectively, of a system for outputting a panoramic image (hereinafter simply referred to as a panoramic image outputting system).

FIG. 1 is a diagram illustrating a panoramic image outputting system according to an embodiment.

Referring to FIG. 1, the panoramic image outputting system includes a plurality of cameras 110 including, for example, a first camera 111, a second camera 112, and a third camera 113, a panoramic image outputting apparatus 120, a display device 130, a still camera 150, and an LUT generating apparatus 160.

The panoramic image outputting system may dispose the cameras 110 including the first camera 111, the second camera 112, and the third camera 113 to be in a radial form based on a central capturing point of the cameras 110 to capture a broad angle of view. Here, to stitch a first input image captured by the first camera 111 and a second input image captured by the second camera 112, the panoramic image outputting system may capture the first input image and the second input image to share an overlapping area of an object and a background in the first input image and the second input image.

The panoramic image outputting apparatus 120 of the panoramic image outputting system may geometrically transform the second input image based on a homography, which is a relationship between the first input image and the second input image, to stitch the geometrically transformed second input image and the first input image. Similarly, the panoramic image outputting apparatus 120 may geometrically transform a third input image based on a homography, which is a relationship between the second input image and the third input image, to stitch the geometrically transformed third input image and the second input image.

The panoramic image outputting apparatus 120 may output or display, through the display device 130, a panoramic image in which the first input image, the second input image, and the third input image are stitched together. For example, as illustrated in FIG. 1, the display device 130 may include a plurality of beam projectors, for example, a first beam projector 131, a second beam projector 132, and a third beam projector 133. For another example, the display device 130 may include a plurality of monitors.

When the display device 130 includes the first beam projector 131, the second beam projector 132, and the third beam projector 133, the display device 130 may output the panoramic image to a screen 140 as illustrated in FIG. 1.

Here, an overlapping area 143 may occur between a first output image 141 output through the first beam projector 131 and a second output image 142 output through the second beam projector 132. Similarly, an overlapping area 145 may occur between the second output image 142 output through the second beam projector 132 and a third output image 144 output through the third beam projector 133.

The still camera 150 may capture the output images displayed on the screen 140 and transfer the captured output images to the LUT generating apparatus 160. The LUT generating apparatus 160 may detect geometric transformation occurring in a process of outputting the panoramic image by receiving, from the still camera 150, an output image of the panoramic image output to the screen 140 or a monitor.

The LUT generating apparatus 160 may generate an LUT that maps an output domain pixel coordinate system of an output image to an input domain pixel coordinate system of an input image based on geometric transformation occurring in the process of generating the panoramic image by stitching the first input image, the second input image, and the third input image, and geometric transformation occurring in the process of outputting the panoramic image through the display device 130. Here, the LUT is mapping information associated with coordinate transformation.

A configuration and an operation of the LUT generating apparatus 160 will be described in detail with reference to FIG. 2.

The panoramic image outputting apparatus 120 may transform the output domain pixel coordinate system of the output image to the input domain pixel coordinate system of the input image using the LUT generated by the LUT generating apparatus 160, and request the display device 130 for output.

The LUT generating apparatus 160 may simultaneously process the geometric transformation occurring in the process of generating the panoramic image by stitching the input images and the geometric transformation occurring in the process of outputting the panoramic image through the display device 130, by generating the LUT that maps the output domain pixel coordinate system of the output image to the input domain pixel coordinate system of the input image.

The panoramic image outputting apparatus 120 may minimize an image processing operation used to output the panoramic image by outputting the panoramic image using the LUT generated by the LUT generating apparatus 160.

Figure 2:
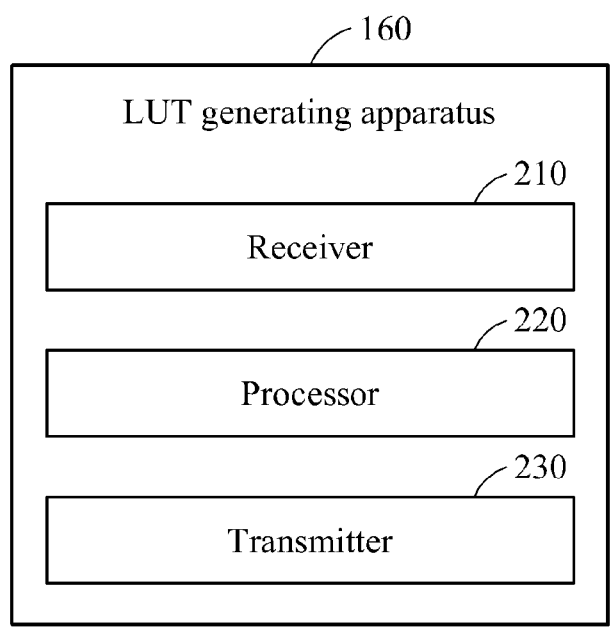
FIG. 2 is a diagram illustrating an apparatus for generating a look-up table (LUT) according to an embodiment.

FIG. 2 is a diagram illustrating the LUT generating apparatus 160 of FIG. 1.

Referring to FIG. 2, the LUT generating apparatus 160 includes a receiver 210, a processor 220, and a transmitter 230.

The receiver 210 may receive, from the cameras 110 of FIG. 1, input images obtained by the cameras 110. The input images are images having an overlapping area between an input image and a neighboring input image. For example, the input images may include an input image $C_1$ obtained by a first camera through an input image $C_x$ obtained by an x-th camera. The receiver 210 may receive, from the still camera 150 of FIG. 1, an output image captured by the still camera.

The processor 220 may determine first geometric correction information to transform an input domain pixel coordinate system of an input image to a panorama domain pixel coordinate system of a panoramic image. The panoramic image may be an image obtained by connecting the input image to another neighboring input image. Here, the first geometric correction information may be a transform function $T_{C_x}$ used to transform an input domain pixel coordinate system $(x_i^C, y_i^C)$ of the input image $C_x$ to a panorama domain pixel coordinate system $(x_i^g, y_i^g)$ of the panoramic image. For example, the transform function $T_{C_x}$ may be represented as Equation 1.

$$(x_i^g, y_i^g) = Hc_i(\gamma_i)(x_i^C, y_i^C)) \qquad \text{[Equation 1]}$$

In Equation 1, "$H_{Ci}$" denotes a homography matrix among cameras capturing input images. A rotational transformation function "$\gamma_i$" refers to a function to map each of the cameras capturing the input images to a cylindrical screen having a radius equal to a focal distance of a camera. That is, the processor 220 may transform the input domain pixel coordinate system $(x_i^C, y_i^C)$ of the input image $C_x$ to the panorama domain pixel coordinate system $(x_i^g, y_i^g)$ of the panoramic image by applying rotational transformation and homography transformation to the input domain pixel coordinate system $(x_i^C, y_i^C)$ of the input image $C_x$.

The processor 220 may inversely transform the first geometric correction information. For example, the processor 220 may inversely transform the transform function $T_{C_x}$ to calculate a transform function $T_{C_x}^{-1}$. Here, the processor 220 may calculate a blending mask $B_{C_x}$ and a color correction parameter of the input image. Here, the blending mask refers to information for controlling a brightness of the input image based on an overlapping area between the input image and another input image.

The processor 220 may determine second geometric correction information to transform an output domain pixel coordinate system of the output image to the panorama domain pixel coordinate system of the panoramic image. The output image may be an image including geometric transformation occurring in a process of capturing a result of outputting the panoramic image through the display device 130 of FIG. 1 using the still camera 150 and outputting the panoramic image through the display device 130.

For example, the panoramic image outputting apparatus 120 of FIG. 1 may output the panoramic image including a preset pattern through the display device 130. The processor 220 may compare the preset pattern to a pattern included in the output image, and measure a geometrical change occurring in the process of outputting the panoramic image through the display device 130.

For example, the output image may include an output image $D_1$ output through a first display device through an output image $D_x$ output through an x-th display device. The second geometric correction information may be a transform function $T_{D_x}$ to transform an output domain pixel coordinate system $(x_k^D, y_k^D)$ of the output image Dx to the panorama domain pixel coordinate system $(x_i^g, y_i^g)$ of the panoramic image.

For example, in a case of the screen 140 being a plane, the transform function $T_{D_x}$ may be represented as Equation 2 using an inverse matrix $H_{Dk}^{-1}$ of $H_{Dk}$.

$$(x_i^g, y_i^g) = H_{Dk}^{-1}(x_k^D, y_k^D) \qquad \text{[Equation 2]}$$

In Equation 2, "$H_{Dk}$" denotes a homography matrix between output domain pixel coordinates of a k-th output image and panorama domain pixel coordinates of a panoramic image.

The processor 220 may transform the output domain pixel coordinate system $(x_k^D, y_k^D)$ of the output image $D_x$ to the panorama domain pixel coordinate system $(x_i^g, y_i^g)$ of the panoramic image by applying the homography transformation to the output domain pixel coordinate system $(x_k^D, y_k^D)$ of the output image $D_x$.

For another example, in a case of the screen 140 being a cylindrical screen as illustrated in FIG. 1, the transform function $T_{D_x}$ may be represented as Equation 3 using the inverse matrix $H_{Dk}^{-1}$ of the homography matrix $H_{Dk}$ and an inverse function $\beta_k^{-1}$ of a function $\beta_k$.

$$(x_i^g, y_i^g) = H_{Dk}^{-1} \beta_k^{-1}(x_k^D, y_K^D) \qquad \text{[Equation 3]}$$

In Equation 3, "$\beta_k$" denotes a function to calculate a Bezier correction for a k-th output image.

A Bezier surface of the output image may be of a type of a polynomial surface using a Bernstein polynomial to generate a two-dimensional (2D) surface using separate control points. Here, a location of each control point may be used to determine a form and a curvature of the Bezier surface.

A complete quadrilateral surface may be a second degree Bezier surface having nine control points. The nine control points may include four corner control points, four edge control points, and one center control point. When any one of the control points moves from an initial location, the surface may be deformed depending on the movement. A surface point closer to a control point may receive a more intensified force.

The second degree Bezier surface on a second-order (u,v) plane may include B(u) and B(v), which are two separate parametric curves orthogonal to each other, and may be defined as a (2+1)(2+1) control point.

Each Bezier parameter value of the output image may be determined between 0 and 1. For example, the Bezier parameter value of the output image may be determined based on Equation 4.

$$\beta_k(u, v) = \sum_{p=0}^{2} \sum_{q=0}^{2} B_2^p(u) B_2^q(v) k_{pq} \quad \begin{cases} 0 \le u \le 1 \\ 0 \le v \le 1 \end{cases} \qquad \text{[Equation 4]}$$

$$B_2^p(u) = \binom{2}{p} u^p (1-u)^{2-p},$$

$$B_2^q(v) = \binom{2}{q} v^q (1-v)^{2-q}$$

In Equation 4, "$k_{ij}$" denotes a set of control points. $B_2^p(u)$ indicating a Bezier curve on a u parametric axis and $B_2^q(v)$ indicating a Bezier curve on a v parametric axis may be determined based on Equation 4.

"$\beta_k$," which is the function to calculate the Bezier correction for the k-th output image, may be used to correct the k-th output image projected to the cylindrical screen to appear as being projected to a flat surface.

That is, the processor 220 may transform the output domain pixel coordinate system $(x_k^D, y_k^D)$ of the output image $D_x$ to the panorama domain pixel coordinate system $(x_i^g, y_i^g)$ of the panoramic image by applying the Bezier correction and the homography transformation to the output domain pixel coordinate system $(x_k^D, y_k^D)$ of the output image $D_x$.

For example, in a case of the display device 130 corresponding to a multi-projector environment including a plurality of beam projectors, a location to which each beam projector outputs the panoramic image may not be fixed. To match images output from the beam projectors, areas of the output images may overlap, and thus the display device 130 may display the output images having the overlapping areas on the screen 140.

Here, due to the overlapping of the output images, the overlapping areas may have a contour, a color, a brightness, and the like of an object, which are differently expressed from those in other areas. The panoramic image outputting apparatus 120 may prevent the overlapping areas of the output images from being differently expressed from other areas by geometrically transforming the panoramic image. Here, an output image output from the display device 130 may be the geometrically transformed panoramic image, and thus the second geometric correction information may be a transform function to transform the panorama domain pixel coordinate system of the panoramic image to a pixel coordinate system of a domain of the geometrically transformed panoramic image.

For another example, in a case of the display device 130 corresponding to a multi-panel environment including a plurality of monitors, the overlapping of the output images may be unnecessary because the multi-panel environment is formed in a side-by-side structure. Since the overlapping does not occur by the output images, the panoramic image outputting apparatus 120 may not need to geometrically transform the panoramic image. Thus, the panorama domain pixel coordinate system of the panoramic image, which is a result of transforming the output image $D_x$ using the transform function $T_{D_x}$, may be identical to the output domain pixel coordinate system of the output image $D_x$. Thus, the second geometric correction information may be information to set the output domain pixel coordinate system of the output image to be the panorama domain pixel coordinate system of the panoramic image.

Here, the processor 220 may determine a blending mask $B_{D_x}$ of the output image $D_x$. In the case of the display device 130 corresponding to the multi-panel environment including the monitors, the overlapping of the output images may not occur, and thus the processor 220 may determine the blending mask $B_{D_x}$ to be 1.

The processor 220 may determine third geometric correction information to transform the output domain pixel coordinate system of the output image to the input domain pixel coordinate system of the input image based on the first geometric correction information and the second geometric correction information.

The processor 220 may determine the third geometric correction information by combining inversely transformed first geometric correction information and the second geometric correction information. For example, the third geometric correction information may be a transform function $T_{D_x C_x}$ in which a transform function $T_{C_x}^{-1}$ obtained by inversely transforming the transform function $T_{C_x}$ and the transform function $T_{D_k}$.

For example, the transform function $T_{D_x C_x}$ may be represented as Equation 5.

$$C_{i,k} = T_{D_x C_x}(D_{i,k}) \quad \text{[Equation 5]}$$

In Equation 5, "$C_{i,k}$" denotes an i-th input image $C_x$, and "$D_{i,k}$" denotes a k-th output image $D_x$.

For example, based on Equation 1 indicating the transform function $T_{C_x}$ and Equation 3 indicating the transform function $T_{D_x}$ in the case of the screen 140 being the cylindrical screen, Equation 5 may be represented as Equation 6 applying complex rendering and stitching transformation to input domain pixel coordinates $(x_{i,k}^C, y_{i,k}^C)$ of the i-th input image $C_{i,k}$ and output domain pixel coordinates $(x_k^D, y_k^D)$ of the k-th output image $D_{i,k}$.

$$(x_{i,k}^C, y_{i,k}^C) = \gamma_i^{-1} H_{Ci}^{-1} H_{Dk}^{-1} \beta_k^{-1}(x_k^D, y_k^D) \quad \text{[Equation 6]}$$

In Equation 6, "$H_{Ci}^{-1}$" denotes an inverse matrix of $H_{Ci}$ in Equation 1, and "$\gamma_i^{-1}$" denotes an inverse function of the rotational transformation function $\gamma_i$ in Equation 1.

That is, the processor 220 may determine the input domain pixel coordinates $(x_{i,k}^C, y_{i,k}^C)$ of the i-th input image $C_{i,k}$ corresponding to $(x_k^D, y_k^D)$ by applying the Bezier correction, the homographic transformation, and the rotational transformation to the output domain pixel coordinates $(x_k^D, y_k^D)$ of the k-th output image $D_{i,k}$.

In detail, the processor 220 may calculate the panorama domain pixel coordinate system $(x_{i,k}^P, y_{i,k}^P)$ of the panoramic image using a result of performing the Bezier correction on the output domain pixel coordinate system of the output image. For example, the processor 220 may determine $x_k^{DH}, y_k^{DH}$, which is the result of performing the Bezier correction by applying the inverse function $\beta_k^{-1}$ of $\beta_k^{-1}$ to the output domain pixel coordinate system $(x_k^D, y_k^D)$ of the output image as represented in Equation 7.

$$(x_k^{DH}, y_k^{DH}) = \beta_k^{-1}(x_k^D, y_k^D) \quad \text{[Equation 7]}$$

The processor 220 may calculate the panorama domain pixel coordinate system $(x_{i,k}^P, y_{i,k}^P)$ of the panoramic image by performing the homographic transformation on the result of the Beizer correction. For example, the processor 220 may calculate the panorama domain pixel coordinate system $(x_{i,k}^P, y_{i,k}^P)$ of the panoramic image using $x_k^{DH}, y_k^{DH}$ as represented in Equation 8.

$$x_{i,k}^P = \frac{t_1 x_k^{DH} + t_2 y_k^{DH} + t_3}{t_7 x_k^{DH} + t_8 y_k^{DH} + t_9},$$

$$y_{i,k}^P = \frac{t_4 x_k^{DH} + t_5 y_k^{DH} + t_6}{t_7 x_k^{DH} + t_8 y_k^{DH} + t_9} \quad \text{[Equation 8]}$$

In Equation 8, "$t_{y=1, 2, \ldots, 9}$" denotes a homography parameter of the $H_{Dk}^{-1}$ matrix.

The processor 220 may match a display domain coordinate system $(x_{i,k}^D, y_{i,k}^D)$ to the input domain pixel coordinate system $(x_{i,k}^C, y_{i,k}^C)$ of the input image $C_{i,k}$ without generating a panoramic image using $H_{Ci}^{-1}$ and $\gamma_i^{-1}$. Here, the display domain coordinate system $(x_{i,k}^D, y_{i,k}^D)$ may indicate coordinates included in the k-th output image $D_x$ among coordinates included in the i-th input image $C_x$. That is, $x_{i,k}^D, y_{i,k}^D$ and $x_k^D, y_k^D$ may be identical to or differ from each other based on the i-th input image $C_x$ corresponding to $x_{i,k}^D, y_{i,k}^D$.

In detail, the processor 220 may calculate corrected domain pixel coordinates $(x_{i,k}^{C'}, y_{i,k}^{C'})$ of the input image $C_{i,k}$ by performing the homographic transformation on the panorama domain pixel coordinate system $(x_{i,k}^P, y_{i,k}^P)$ of the panoramic image.

For example, the processor 220 may calculate the corrected domain pixel coordinates $(x_{i,k}^{c'}, y_{i,k}^{c'})$ of the input image $C_{i,k}$ using the panorama domain pixel coordinate system $(x_{i,k}^P, y_{i,k}^P)$ of the panoramic image as represented in Equation 9.

$$x_{i,k}^{c'} = \frac{h_1 x_{i,k}^P + h_2 y_{i,k}^P + h_3}{h_7 x_{i,k}^P + h_8 y_{i,k}^P + h_9},$$

$$y_{i,k}^{c'} = \frac{h_4 x_{i,k}^P + h_5 y_{i,k}^P + h_6}{h_7 x_{i,k}^P + h_8 y_{i,k}^P + h_9} \quad \text{[Equation 9]}$$

In Equation 9, "$h_{\gamma=1, 2, \ldots, 9}$" denotes a homography parameter of the $H_{Ci}^{-1}$ matrix.

The inverse function $\gamma_g^{-1}$ of the rotational transformation function $\gamma_i$ may be represented as in Equation 10.

$$x_{i,k}^c = f\tan\left(\frac{x_{i,k}^{c'}}{f}\right),$$

$$y_{i,k}^c = y_i' \sec\left(\frac{y_{i,k}^{c'}}{f}\right)$$

[Equation 10]

The processor 220 may output the input domain pixel coordinates $(x_{i,k}^C, y_{i,k}^C)$ of the i-th input image $C_{i,k}$ by applying the inverse function $\gamma_i^{-1}$ of the rotational transformation function $\gamma_i$ to the corrected domain pixel coordinates $(x_{i,k}^{C'}, y_{i,k}^{C'})$ to the i-th input image $C_{i,k}$.

The processor 220 may generate an LUT that maps the output domain pixel coordinate system of the output image to the input domain pixel coordinate system of the input image based on the third geometric correction information. In detail, the processor 220 may determine an input domain pixel coordinate system of the input image corresponding to an output domain pixel coordinate system of the output image using the third geometric correction information. The processor 220 may generate the LUT, for example, $LUT_{D_xC_x}$, as illustrated in Table 1 by mapping the determined input domain pixel coordinate system of the input image to the output domain pixel coordinate system of the output image corresponding to the input domain pixel coordinate system of each input image.

TABLE 1

| Source x* | Source y* | Destination x⁺ | Destination y⁺ |
|---|---|---|---|
| −10 | −1 | 0 | 0 |
| 50 | −15 | 50 | 0 |
| 122 | −2 | 100 | 0 |
| −15 | 45 | 0 | 50 |
| 50 | 45 | 50 | 50 |
| 134 | 45 | 100 | 50 |
| −8 | 120 | 0 | 100 |
| 50 | 170 | 50 | 100 |
| 124 | 115 | 100 | 100 |

In Table 1, "Source" indicates coordinates of an input image $C_x$, and "Destination" indicates coordinates of an output image $D_x$ to be finally displayed. A minus coordinate value in the Source indicates a coordinate value of a neighboring input image in a left side of the input image $C_x$, and a coordinate value in the Source greater than a coordinate value in the Destination indicates a coordinate value of a neighboring input image in a right side of the input image $C_x$.

In a case of the display device 130 corresponding to the multi-panel environment, warping may not occur due to an overlapping area or projection to a cylindrical screen in a displaying process. Thus, the processor 220 may determine the panorama domain pixel coordinate system $(x_i^g, y_i^g)$ of the panoramic image by applying Equation 1 to the input domain pixel coordinates $(x_{i,k}^C, y_{i,k}^C)$ of the i-th input image $C_{i,k}$, and determine the output domain pixel coordinates $(x_k^D, y_k^D)$ of the k-th output image $D_{i,k}$ by applying an offset of each panel of the display device 130 to the panorama domain pixel coordinate system $(x_i^g, y_i^g)$ of the panoramic image.

The transmitter 230 may transmit the LUT generated by the processor 220 to the panoramic image outputting apparatus 120.

Figure 3:
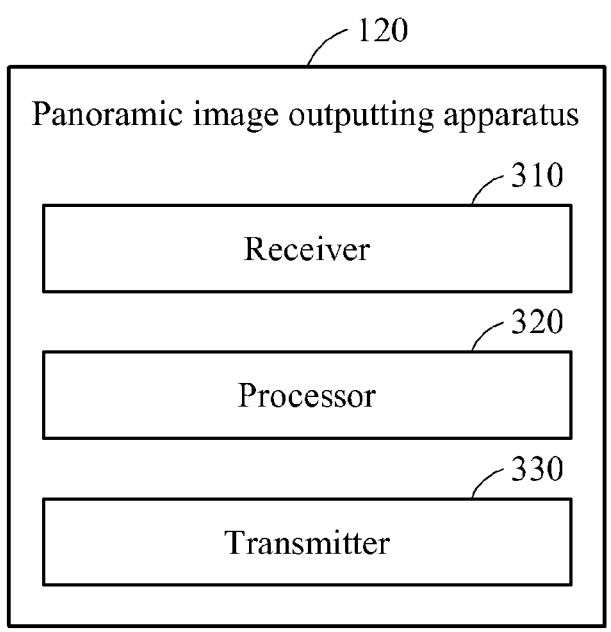
FIG. 3 is a diagram illustrating an apparatus for outputting a panoramic image according to an embodiment.

FIG. 3 is a diagram illustrating the panoramic image outputting apparatus 120 of FIG. 1.

Referring to FIG. 3, the panoramic image outputting apparatus 120 includes a receiver 310, a processor 320, and a transmitter 330.

The receiver 310 may receive, from the cameras 110 of FIG. 1, input images obtained by the cameras 110. Here, the input images may be images including an overlapping area between an input image and a neighboring input image. For example, the input images may include an input image $C_1$ captured by a first camera through an input image $C_x$ captured by an x-th camera.

The receiver 310 may receive, from the LUT generating apparatus 160 of FIG. 1, an LUT that maps an input domain pixel coordinate system of an input image to an output domain pixel coordinate system of an output image output through a plurality of display devices. The receiver 310 may receive, from the LUT generating apparatus 160, a blending mask $B_{C_x}$ of the input image, a color correction parameter of the input image, and a blending mask $B_{D_x}$ of the output image.

The processor 320 may apply a first blending mask to the input image received by the receiver 310. The first blending mask may be the blending mask $B_{C_x}$ of the input image calculated by the LUT generating apparatus 160.

The processor 320 may apply the color correction parameter to the input image to which the first blending mask is applied. The color correction parameter may be a color correction parameter of the input image calculated by the LUT generating apparatus 160.

The processor 320 may transform, to the output image, the input image to which the first blending mask is applied using the LUT received by the receiver 310.

The processor 320 may apply a second blending mask to the output image. The second blending mask may be the blending mask $R_{D_x}$ of the output image calculated by the LUT generating apparatus 160.

The transmitter 330 may transmit, to the display device 130 of FIG. 1, the output image to which the second blending mask is applied to allow the display device 130 to output the output image.

Figure 4:
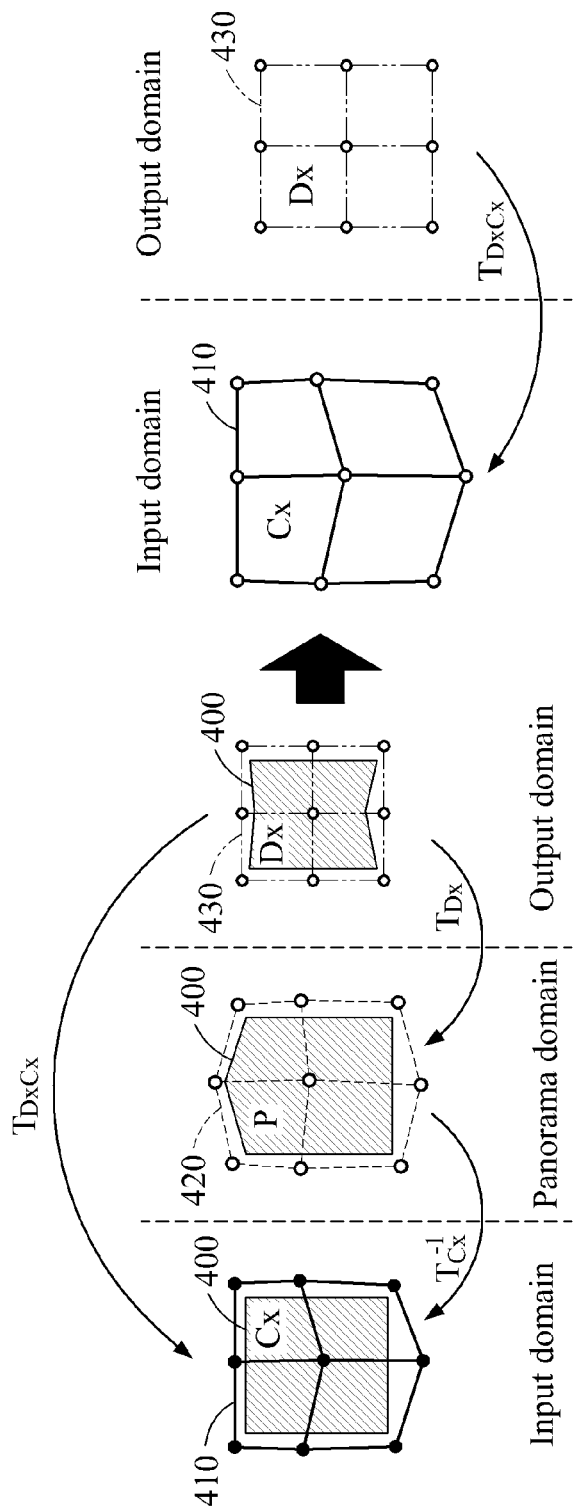
FIG. 4 illustrates an example of geometric correction information according to an embodiment.

FIG. 4 illustrates an example of geometric correction information according to an embodiment.

Referring to FIG. 4, the LUT generating apparatus 160 of FIG. 1 may determine a transform function $T_{C_x}$, which is first geometric correction information, to transform an input domain pixel coordinate system 410 of an input image $C_x$ to a panorama domain pixel coordinate system 420 of a panoramic image P. Here, a form of an object 400 included in the input image $C_x$ may change as the input domain pixel coordinate system 410 is transformed to the panorama domain pixel coordinate system 420 as illustrated in FIG. 4.

The processor 220 of FIG. 2 may inversely transform the transform function $T_{C_x}$ to calculate a transform function $T_{C_x}^{-1}$. Thus, the processor 220 may calculate the transform function $T_{C_x}^{-1}$ to transform the panorama domain pixel coordinate system 420 of the panoramic image P to the input domain pixel coordinate system 410 of the input image $C_x$.

In addition, the processor 220 may calculate a transform function $T_{D_x}$, which is second geometric correction information, to transform an output domain pixel coordinate system 430 of an output image $D_x$ to the panorama domain pixel coordinate system 420 of the panoramic image P.

The processor 220 may determine third geometric correction information to transform the output domain pixel coordinate system 430 of the output image $D_x$ to the input domain pixel coordinate system 410 of the input image $C_x$ based on the first geometric correction information and the second geometric correction information. The processor 220 may determine a transform function $T_{D_xC_x}$, which is the third geometric correction information, by combining the transform function $T_{C_x}^{-1}$ and the transform function $T_{D_x}$.

Here, the transform function $T_{D_xC_x}$ may be a combination of the transform function $T_{D_x}$ to transform the output domain pixel coordinate system 430 of the output image $D_x$ to the panorama domain pixel coordinate system 420 of the panoramic image P and the transform function $T_{C_x}^{-1}$ to transform the panorama domain pixel coordinate system 420 of the panoramic image P to the input domain pixel coordinate system 410 of the input image $C_x$. Thus, as illustrated in a right portion of FIG. 4, the transform function $T_{D_xC_x}$ may directly transform the output domain pixel coordinate system 430 of the output image $D_x$ to the input domain pixel coordinate system 410 of the input image $C_x$ by omitting a process of transforming the output domain pixel coordinate system 430 of the output image $D_x$ to the panorama domain pixel coordinate system 420 of the panoramic image P.

Figure 5:
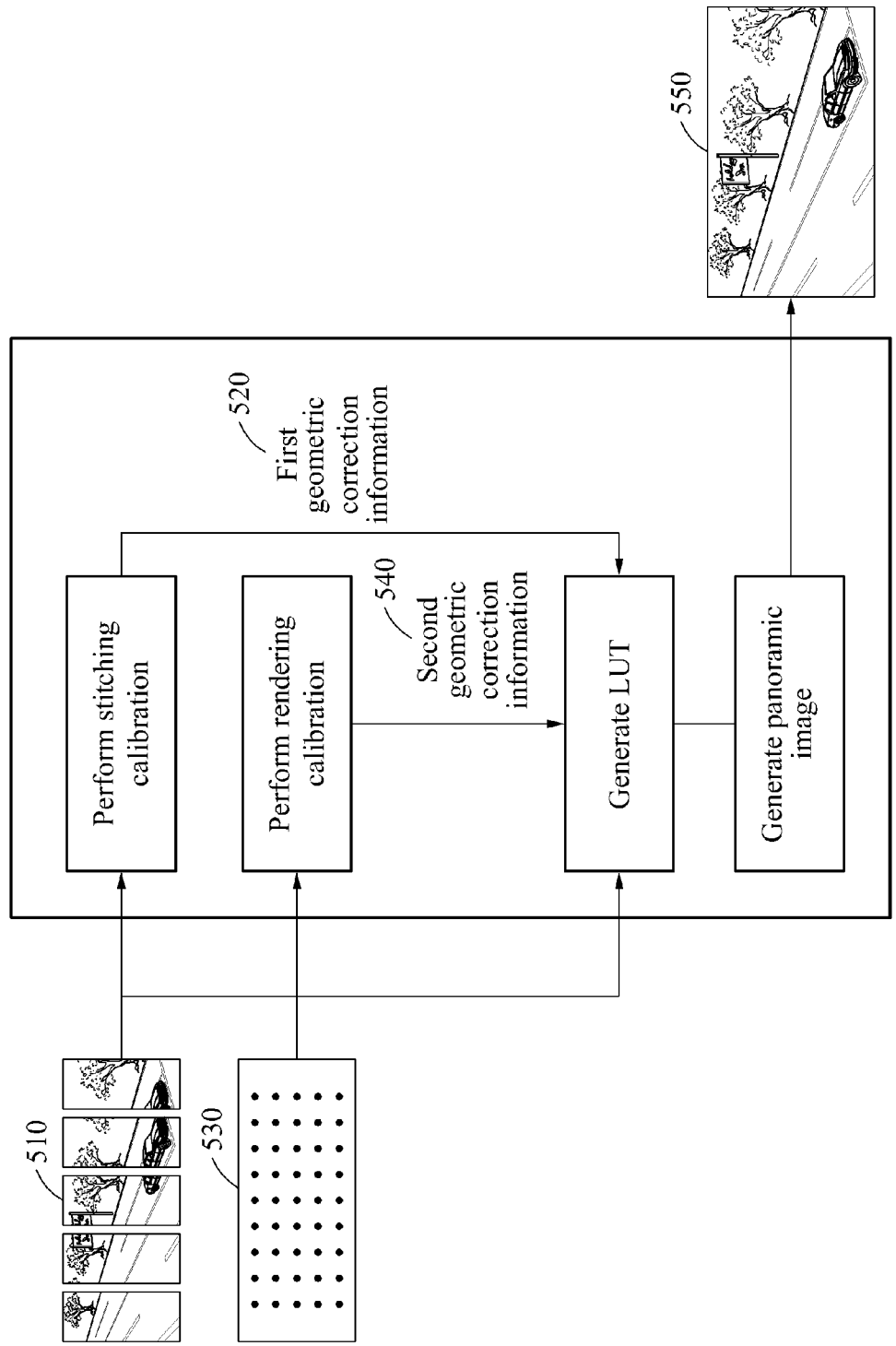
FIG. 5 illustrates an example of a process of outputting a panoramic image according to an embodiment.

FIG. 5 illustrates an example of a process of outputting a panoramic image according to an embodiment.

Referring to FIG. 5, the LUT generating apparatus 160 of FIG. 1 may perform stitching calibration on input images 150 obtained by a plurality of cameras, and determine first geometric correction information 520 to transform an input domain pixel coordinate system of the input images 510 to a panorama domain pixel coordinate system of a panoramic image. The LUT generating apparatus 160 may determine a transform function to transform the input domain pixel coordinate system of the input images 510 to the panorama domain pixel coordinate system of the panoramic image generated by stitching the input images 510.

The first geometric correction information 520 may include geometric correction information among the input images 510 and blending information of the input images 510.

The LUT generating apparatus 160 may perform rendering calibration on an output image 530 obtained by capturing the panoramic image output through the display device 130 of FIG. 1 using the still camera 150 of FIG. 1, and determine second geometric correction information 540 to transform an output domain pixel coordinate system of the output image 530 to the panorama domain pixel coordinate system of the panoramic image. Here, the output image 530 may be an image including a geometrical change occurring in a process of the still camera 150 capturing a result of outputting the panoramic image including a preset pattern to the display device 130 and outputting the panoramic image through the display device 130. In addition, the LUT generating apparatus 160 may determine a transform function to transform the output domain pixel coordinate system of the output image 530 to the panorama domain pixel coordinate system of the panoramic image including the preset pattern.

The second geometric correction information 540 may include geometric correction information in the output image 530 and blending information of the output image 530.

The LUT generating apparatus 160 may generate third geometric correction information to transform the output domain pixel coordinate system of the output image 530 to the input domain pixel coordinate system of the input images 510 based on the first geometric correction information 520 and the second geometric correction information 540. The LUT generating apparatus 160 may generate an LUT that maps the input domain pixel coordinate system of the input images 510 to the output domain pixel coordinate system of the output image 530 based on the third geometric correction information.

The panoramic image outputting apparatus 120 of FIG. 1 may output a panoramic image 550 in which the input domain pixel coordinate system of the input images 510 is transformed by applying the LUT to the input images 510. The input domain pixel coordinate system of the input images 510 may be a geometrically transformed coordinate system illustrated as the input domain pixel coordinate system 410 in FIG. 4. The domain pixel coordinate system of the geometrically transformed input images 510 may be transformed to be an original form captured by a camera as illustrated as the output domain pixel coordinate system 430 in FIG. 4 due to a geometric transformation occurring in the outputting process of the display device 130

Figure 6:
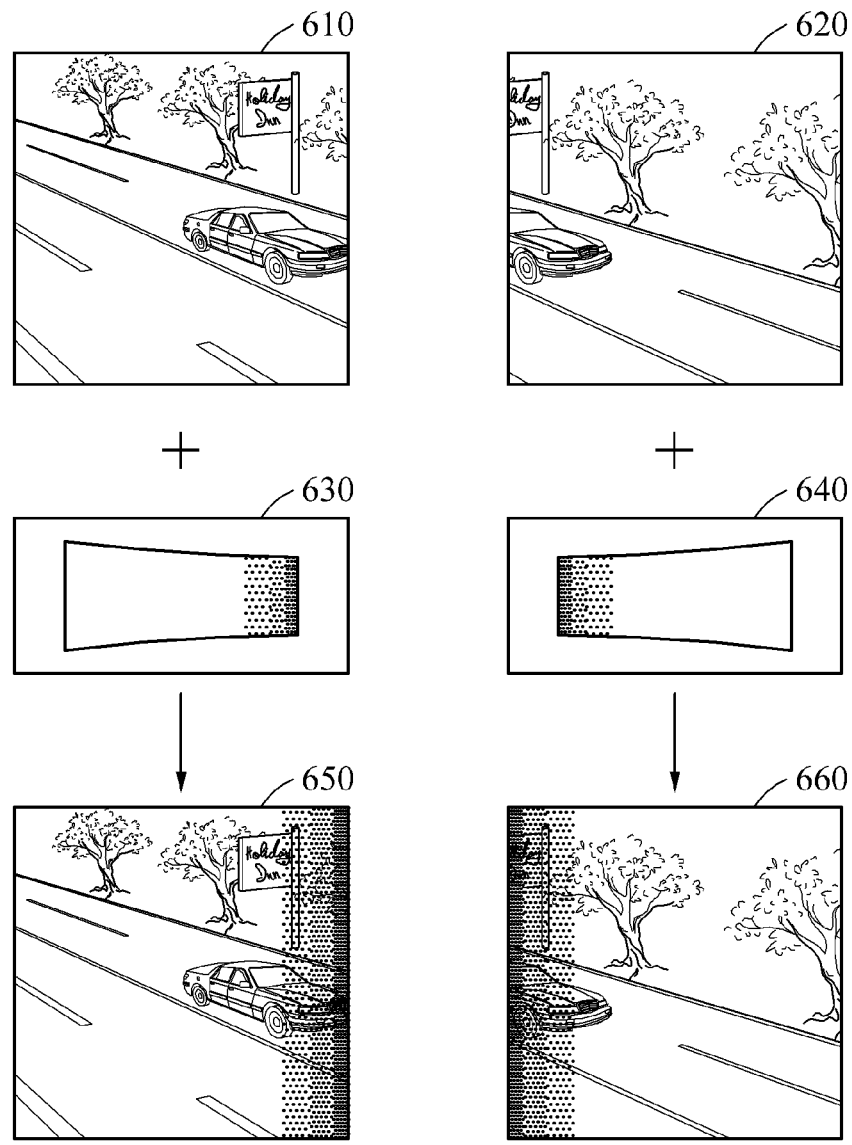
FIG. 6 illustrates an example of a process of applying a first blending mask to an input image according to an embodiment.

FIG. 6 illustrates an example of a process of applying a first blending mask to an input image according to an embodiment.

Referring to FIG. 6, the first camera 111 and the second camera 112 of FIG. 1 may obtain a first input image 610 and a second input image 620, respectively.

Here, the LUT generating apparatus 160 of FIG. 1 may calculate a blending mask 630 of the first input image 610 and a blending mask 640 of the second input image 620. When a panoramic image is displayed on a curved screen, the blending mask 630 may be calculated with a left direction closer to a user from the curved screen being wider than a central direction remote from the user. In addition, the blending mask 630 may be calculated with a brightness of a right area overlapping the second input image 620 being lower than a brightness of other areas.

Similarly, the blending mask 640 may be calculated with a right direction closer to the user being wider than the central direction remote from the user. In addition, the blending mask 640 may be calculated with a brightness of a left area overlapping the first input image 610 being lower than a brightness of other areas.

The panoramic image outputting apparatus 120 of FIG. 1 may apply the blending mask 630 and the blending mask 640 to the first input image 610 and the second input image 620, respectively.

A brightness of a right area overlapping the second input image 620 of a first input image 650 obtained by applying the blending mask 630 may be lower than a brightness of other areas of the first input image 650. Similarly, a brightness of a left area overlapping the first input image 610 of a second input image 660 obtained by applying the blending mask 640 may be lower than a brightness of other areas of the second input image 660.

Figure 7:
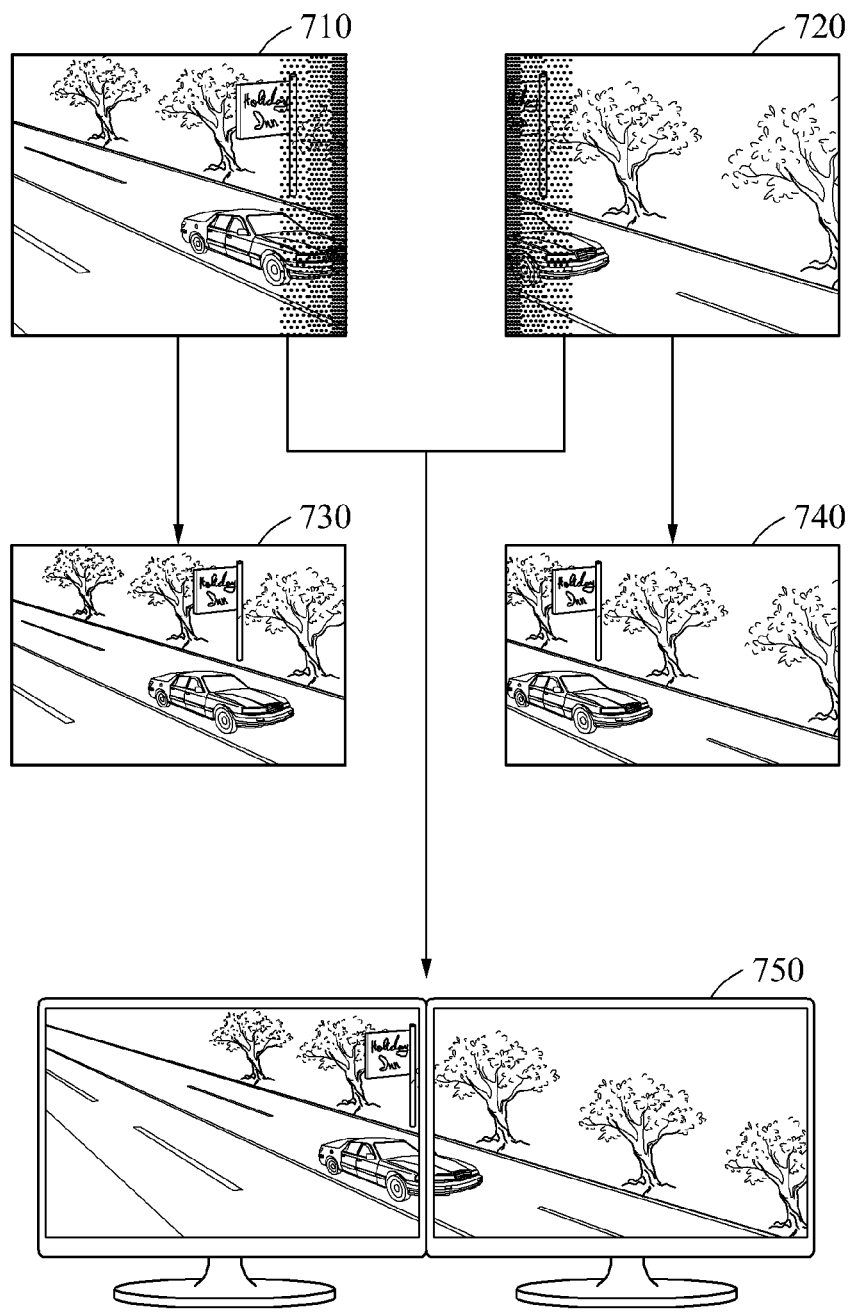
FIG. 7 illustrates an example of an output image corresponding to an input image to which a first blending mask is applied according to an embodiment.

FIG. 7 illustrates an example of an output image corresponding to an input image to which a first blending mask is applied according to an embodiment.

For example, in a case of the display device 130 of FIG. 1 corresponding to a multi-projector environment including a first beam projector and a second beam projector, the panoramic image outputting apparatus 120 of FIG. 1 may stitch a first input image 710 obtained by applying the blending mask 630 of FIG. 6 and a second input image 720 obtained by applying the blending mask 640 of FIG. 6 to output a first output image 730 and a second output image 740, respectively.

Here, the first output image 730 may include a greater right area than the first input image 710 through stitching of a left area of the second input image 720 to a right area of the first input image 710. Similarly, the second output image 740 may include a greater left area than the second input image 720 through stitching of the left area of the second input image 720 to the right area of the first input image 710.

The first beam projector and the second beam projector may display the first output image 730 and the second output image 740 to allow the right area of the first output image 730 and the left area of the second output image 740 to overlap each other.

For another example, in a case of the display device 130 corresponding to a multi-panel environment including a first monitor and a second monitor, the display device 130 may not display output images without overlapping the output images.

Thus, the panoramic image outputting apparatus 120 may output a first output image 750 in which the right area of the first input image 710 is deleted based on the blending mask 630 and the second input image 720, and a second output image 760 in which the left area of the second input image 720 is deleted based on the blending mask 640 and the first input image 710.

Here, the first monitor and the second monitor of the display device 130 may output the first output image 750 and the second output image 760 as illustrated in FIG. 7.

Figure 8A:
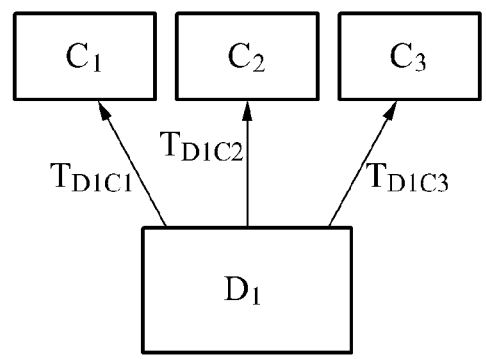
FIGS. 8A and 8B illustrate examples of a method of outputting a panoramic image using an LUT according to an embodiment.
Figure 8B:
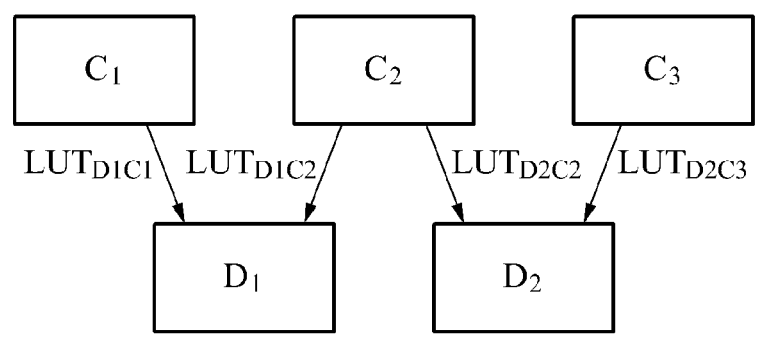

FIGS. 8A and 8B illustrate examples of a panoramic image outputting method using an LUT according to an embodiment.

FIG. 8A illustrates Case 1 in which a single display device outputs a panoramic image generated from a first input image $C_1$, a second input image $C_2$, and a third input image $C_3$ to display an output image $D_1$.

The LUT generating apparatus 160 of FIG. 1 may determine a transform function $T_{D_1C_1}$ based on a transform function $T_{C_1}$ to transform an input domain pixel coordinate system of the first input image $C_1$ to a panorama domain pixel coordinate system of the panoramic image and on a transform function $T_{D_1}$ to transform an output domain pixel coordinate system of the output image $D_1$ to the panorama domain pixel coordinate system of the panoramic image.

The LUT generating apparatus 160 may determine a transform function $T_{D_1C_2}$ based on a transform function $T_{C_2}$ to transform an input domain pixel coordinate system of the second input image $C_2$ to the panorama domain pixel coordinate system of the panoramic image and on the transform function $T_{D_1}$ to transform the output domain pixel coordinate system of the output image $D_1$ to the panorama domain pixel coordinate system of the panoramic image.

The LUT generating apparatus 160 may determine a transform function $T_{D_1C_3}$ based on a transform function $T_{C_3}$ to transform an input domain pixel coordinate system of the third input image $C_3$ to the panorama domain pixel coordinate system of the panoramic image and on the transform function $T_{D_1}$ to transform the output domain pixel coordinate system of the output image $D_1$ to the panorama domain pixel coordinate system of the panoramic image.

The LUT generating apparatus 160 may generate a corresponding LUT based on each of the transform function $T_{D_1C_1}$, the transform function $T_{D_1C_2}$, and the transform function $T_{D_1C_3}$.

The panoramic image outputting apparatus 120 of FIG. 1 may output the output image $D_1$ by applying the corresponding LUTs to the first input image $C_1$, the second input image $C_2$, and the third input image $C_3$ based on the transform function $T_{D_1C_1}$, the transform function $T_{D_1C_2}$, and the transform function $T_{D_1C_3}$, respectively. Here, the first input image $C_1$, the second input image $C_2$, and the third input image $C_3$ may be geometrically transformed based on a geometric transformation occurring in a process of stitching the input images to be the panoramic image and in a process of displaying the panoramic image as the output image $D_1$. Thus, the panoramic image obtained by stitching the original input images may be displayed as the output image $D_1$ in a form without the geometrical transformation.

FIG. 8B illustrates Case 2 in which a first display device and a second display device output a panoramic image generated from a first input image $C_1$, a second input image $C_2$, and a third input image $C_3$ to display an output image $D_1$.

The LUT generating apparatus 160 may determine a transform function $T_{D_1C_1}$ based on a transform function $T_{C_2}$ to transform an input domain pixel coordinate system of the first input image $C_1$ to a panorama domain pixel coordinate system of the panoramic image and on a transform function $T_{D_1}$ to transform an output domain pixel coordinate system of the output image $D_1$ to the panorama domain pixel coordinate system of the panoramic image. The LUT generating apparatus 160 may generate an LUT $LUT_{D_1C_1}$ based on the transform function $T_{D_1C_1}$.

The LUT generating apparatus 160 may determine a transform function $T_{D_1C_2}$ based on a transform function $T_{C_s}$ to transform an input domain pixel coordinate system of the second input image $C_2$ to the panorama domain pixel coordinate system of the panoramic image. The LUT generating apparatus 160 may generate an LUT $LUT_{D_1C_2}$ based on the transform function $T_{D_1C_2}$.

The LUT generating apparatus 160 may determine a transform function $T_{D_2C_2}$ based on the transform function $T_{C_2}$ and on a transform function $T_{C_2}$ to transform an output domain pixel coordinate system of the output image $D_2$ to the panorama domain pixel coordinate system of the panoramic image. The LUT generating apparatus 160 may generate an LUT $LUT_{D_2C_2}$ based on the transform function $LUT_{D_2C_2}$.

The LUT generating apparatus 160 may determine a transform function $LUT_{D_2C_3}$ based on a transform function $T_{C_s}$ to transform an output domain pixel coordinate system of the third input image $C_3$ to the panorama domain pixel coordinate system of the panoramic image and on the transform function $T_{D_2}$. The LUT generating apparatus 160 may generate an LUT $LUT_{D_2C_3}$ based on the transform function $T_{D_2C_3}$.

The panoramic image outputting apparatus 120 may output the output image $D_1$ by applying the LUT $LUT_{D_1C_1}$ and the LUT $LUT_{D_1C_2}$ to the first input image $C_1$ and the second input image $C_2$. Here, the panoramic image outputting apparatus 120 may geometrically transform a right area of the first input image $C_1$ and a left area of the second input image $C_2$ by applying the LUT $LUT_{D_1C_2}$. The panoramic image outputting apparatus 120 may then output the output image $D_1$ by adding the geometrically transformed left area of the second input image $C_2$ to the geometrically transformed right area of the first input image $C_1$.

In addition, the panoramic image outputting apparatus 120 may output the output image $D_2$ by applying the $LUT_{D_2C_2}$ and the $LUT_{D_2C_3}$ to the second input image $C_2$ and the third input image $C_3$. Here, the panoramic image outputting apparatus 120 may apply the LUT $LUT_{D_2C_2}$ to a remaining area of the second input image $C_2$ from which the left area added to the output image $D_1$ is excluded. The panoramic image outputting apparatus 120 may output the output image $D_2$ by adding a left area of a third input image $C_3$ geometrically transformed by applying the LUT $LUT_{D_2C_3}$ to a right side of the remaining area.

Figure 9:
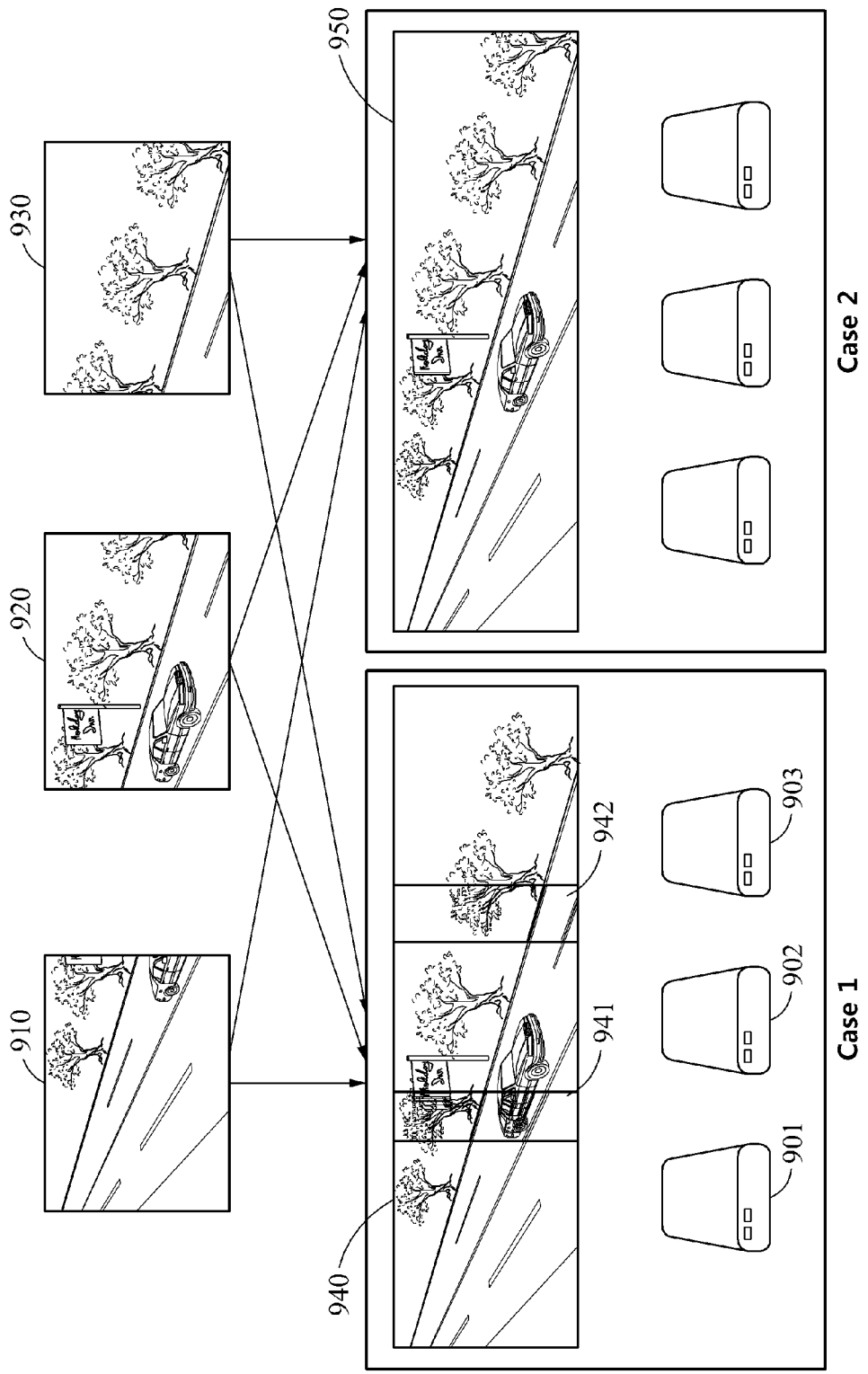
FIG. 9 illustrates examples of a panoramic image output according to an embodiment.

FIG. 9 illustrates examples of a panoramic image output according to an embodiment.

Referring to FIG. 9, a first input image 910, a second input image 920, and a third input image 930 are stitched to generate a panoramic image, and a display device corresponding to a multi-projector environment including a first beam projector 901, a second beam projector 902, and a third beam projector 903 outputs an output image of the panoramic image.

Case 1 of FIG. 9 illustrates an example of an output image 940 output by an existing panoramic image outputting apparatus. The existing panoramic image outputting apparatus may not perform stitching calibration on input images and rendering calibration based on an output image. Thus, the output image 940 output by the existing panoramic image outputting apparatus may include an overlapping area 941 between an image output by the first beam projector 901 and an image output by the second beam projector 902 and an overlapping area 942 between the image output by the second beam projector 902 and an image output by the third beam projector 903.

Case 2 of FIG. 9 illustrates an example of an output image 950 output using an LUT by the panoramic image outputting apparatus 120 of FIG. 1. According to an embodiment, the panoramic image outputting apparatus 120 may display the output image 950 which is a seamless image without a section in which images overlap by performing geometric transformation by applying, to the first input image 910, the second input image 920, and the third input image 930, the LUT that maps an output domain pixel coordinate system of the output image 950 to an input domain pixel coordinate system of the input images and by.

Figure 10:
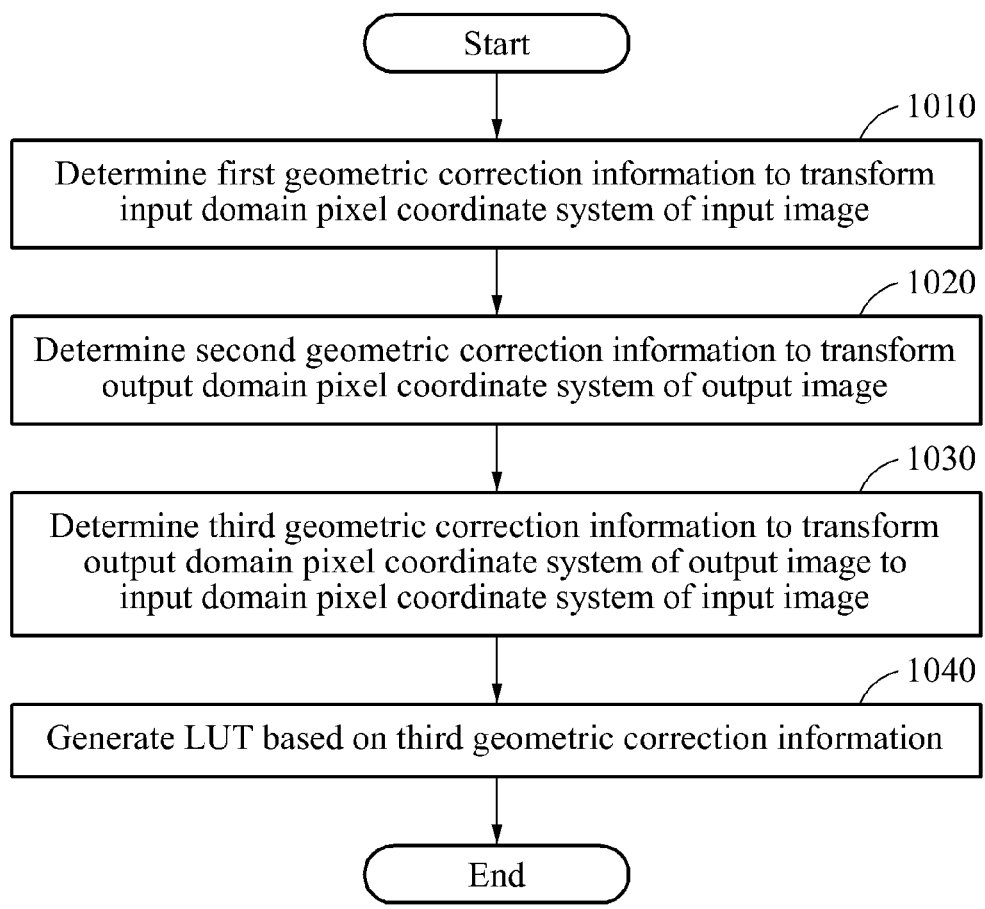
FIG. 10 is a flowchart illustrating a method of generating an LUT according to an embodiment.

FIG. 10 is a flowchart illustrating an LUT generating method according to an embodiment.

Referring to FIG. 10, in operation 1010, the processor 220 of FIG. 2 determines first geometric correction information to transform an input domain pixel coordinate system of an input image to a panorama domain pixel coordinate system of a panoramic image. Here, the first geometric correction information is a transform function $T_{C_x}$ to transform an input domain pixel coordinate system of an input image $C_x$ to the panorama domain pixel coordinate system of the panoramic image.

The processor 220 inversely transforms the first geometric correction information. For example, the processor 220 may calculate a transform function $T_{C_x}^{-1}$ by inversely transforming the transform function $T_{C_x}$.

In operation 1020, the processor 220 determines second geometric correction information to transform an output domain pixel coordinate system of an output image to the panorama domain pixel coordinate system of the panoramic image. Here, the second geometric correction information is a transform function $T_{D_x}$ to transform an output domain pixel coordinate system of an output image $D_x$ to the panorama domain pixel coordinate system of the panoramic image.

In operation 1030, the processor 220 determines third geometric correction information to transform the output domain pixel coordinate system of the output image to the input domain pixel coordinate system of the input image based on the first geometric correction information and the second geometric correction information. For example, the processor 220 may determine a transform function $T_{D_xC_x}$, which is the third geometric correction information, by combining the transform function $T_{C_x}^{-1}$ obtained by inversely transforming the transform function $T_{C_x}$ and the transform function $T_{D_x}$.

In operation 1040, the processor 220 generates an LUT that maps the output domain pixel coordinate system of the output image to the input domain pixel coordinate system of the input image based on the third geometric correction information. For example, the processor 220 may generate the LUT by determining an input domain pixel coordinate system $x_C, y_C$ of an input image corresponding to an output domain pixel coordinate system $x_D, y_D$ of an output image based on at least one of a homographic transform function between the output image and a neighboring output image of the output image, a function to determine a Bezier parameter of an output domain pixel coordinate system of the output image, a homographic transform function between the input image and a neighboring input image of the input image, and a function to correct a zoom or a focal point based on geometric transformation.

Figure 11:
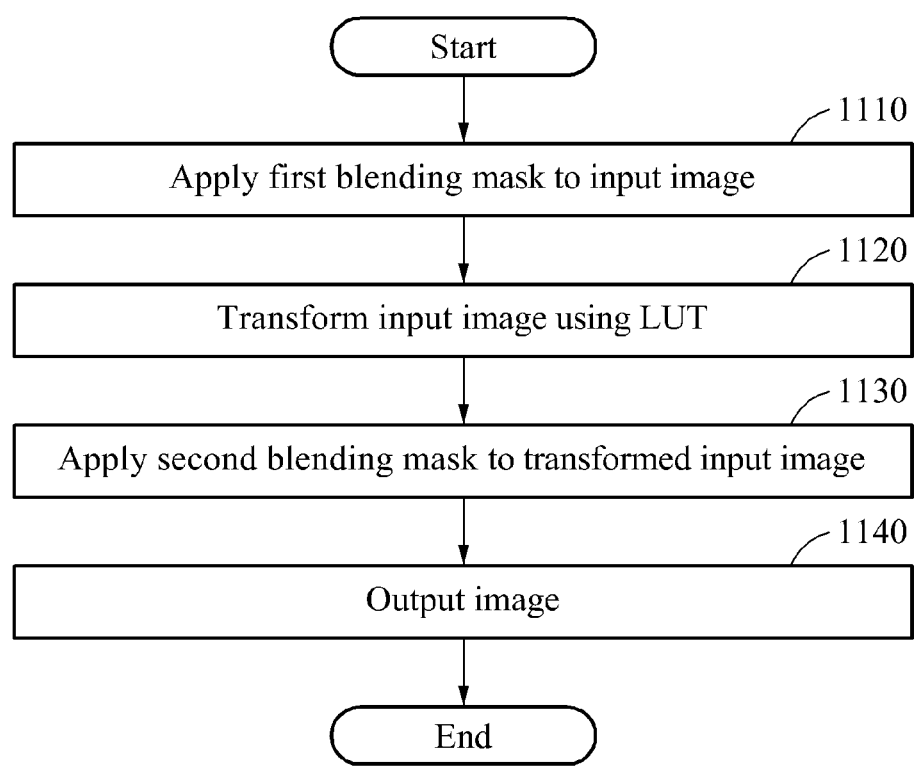
FIG. 11 is a flowchart illustrating a method of outputting a panoramic image according to an embodiment.

FIG. 11 is a flowchart illustrating a panoramic image outputting method according to an embodiment.

Referring to FIG. 11, in operation 1110, the processor 320 of FIG. 3 applies a first blending mask to an input image. Here, the first blending mask is a blending mask $B_{C_x}$ of an input image calculated by the LUT generating apparatus 160 of FIG. 1. In addition, the processor 320 applies a color correction parameter to the input image to which the first blending mask is applied. Here, the color correction parameter is a color correction parameter of the input image calculated by the LUT generating apparatus 160.

In operation 1120, the processor 320 transforms the input image to which the first blending mask is applied in operation 1110 to an output image using an LUT generated by the LUT generating apparatus 160.

In operation 1130, the processor 320 applies a second blending mask to the output image. Here, the second blending mask is a blending mask $B_{D_x}$ of an output image calculated by the LUT generating apparatus 160.

In operation 1140, the transmitter 330 of FIG. 3 transmits, to the display device 130 of FIG. 1, the output image to which the second blending mask is applied by the processor 320 to allow the display device 130 to display the output image.

According to example embodiments, generating an LUT that maps an output domain pixel coordinate system of an output image to an input domain pixel coordinate system of an input image may enable simultaneous processing of geometric transformation occurring in a process of generating a panoramic image by stitching input images and geometric transformation occurring in a process of displaying the panoramic image through a display device.

According to example embodiments, outputting a panoramic image using an LUT that maps an output domain pixel coordinate system of an output image to an input domain pixel coordinate system of an input image may enable minimization of an image processing operation used to display the panoramic image.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of generating a look-up table (LUT), comprising:
    determining first geometric correction information to transform an input domain pixel coordinate system of an input image to a panorama domain pixel coordinate system of a panoramic image in which a neighboring input image is connected to the input image;
    determining second geometric correction information to transform an output domain pixel coordinate system of an output image of the panoramic image output through a plurality of display devices to the panorama domain pixel coordinate system of the panoramic image;
    determining third geometric correction information to transform the output domain pixel coordinate system of the output image to the input domain pixel coordinate system of the input image based on the first geometric correction information and the second geometric correction information; and
    generating an LUT that maps the output domain pixel coordinate system of the output image to the input domain pixel coordinate system of the input image based on the third geometric correction information.

2. The method of claim 1, wherein the determining of the third geometric correction information comprises: determining the third geometric correction information by combining inversely transformed first geometric correction information and the second geometric correction information.

3. The method of claim 1, wherein the determining of the second geometric correction information comprises: setting the output domain pixel coordinate system of the output image to be the panorama domain pixel coordinate system of the panoramic image, in response to the display devices corresponding to a multi-panel environment.

4. The method of claim 1, wherein the generating of the LUT comprises: determining an input domain pixel coordinate system of an input image corresponding to an output domain pixel coordinate system of an output image using at least one of Bezier correction, a homography matrix among cameras capturing the input image, a homography matrix between output domain pixel coordinates of the output image and panorama domain pixel coordinates of a panoramic image, and rotational transformation; and generating the LUT by mapping the determined input domain pixel coordinate system of the input image to the output domain pixel coordinate system of the output image.

5. A method of outputting a panoramic image, comprising:
    applying, to an input image, a first blending mask determined based on an overlapping area between the input image and another input image in a panoramic image in which the input image is connected to the another input image;
    transforming, to transformed input image, the input image to which the first blending mask is applied using a look-up table (LUT) that maps an input domain pixel coordinate system of the input image to an output domain pixel coordinate system of an output image output through a plurality of display devices;
    applying, to the transformed input image, a second blending mask determined based on an overlapping area in the panoramic image output through the display devices; and
    outputting as the output image the transformed input image to which the second blending mask is applied.

6. The method of claim 5, further comprising:
    applying a color correction parameter to the input image to which the first blending mask is applied, and
    wherein the transforming comprises: transforming, to the transformed input image, the input image to which the color correction parameter is applied using the LUT.

7. The method of claim 5, wherein the LUT is generated based on third geometric correction information to transform the output domain pixel coordinate system of the output image to the input domain pixel coordinate system of the input image.

8. The method of claim 7, wherein the third geometric correction information is generated based on first geometric correction information to transform the input domain pixel coordinate system of the input image to a panorama domain pixel coordinate system of the panoramic image and on second geometric correction information to transform the output domain pixel coordinate system of the output image to the panorama domain pixel coordinate system of the panoramic image.

9. The method of claim 7, wherein, in response to the display devices corresponding to a multi-panel environment, the second geometric correction information is used to correct the output domain pixel coordinate system of the output image to be identical to the panorama domain pixel coordinate system of the panoramic image.

10. The method of claim 5, wherein the LUT is generated by mapping, to the output domain pixel coordinate system of the output image, an input domain pixel coordinate system of an input image determined using at least one of Bezier correction, a homography matrix among cameras capturing the input image, a homography matrix between output domain pixel coordinates of the output image and panorama domain pixel coordinates of the panoramic image, and rotational transformation.

11. An apparatus for generating a look-up table (LUT), comprising:
    a processor configured to determine third geometric correction information to transform an output domain pixel coordinate system of an output image to an input domain pixel coordinate system of an input image based on first geometric correction information to transform the input domain pixel coordinate system of the input image to a panorama domain pixel coordinate system of a panoramic image in which a neighboring input image is connected to the input image and on second geometric correction information to transform the output domain pixel coordinate system of the output image of the panoramic image output through a plurality of display devices to the panorama domain pixel coordinate system of the panoramic image, and generate an LUT that maps the output domain pixel coordinate system of the output image to the input domain pixel coordinate system of the input image based on the third geometric correction information.

12. The apparatus of claim 11, wherein the processor is configured to determine the third geometric correction information by combining inversely transformed first geometric correction information and the second geometric correction information.

13. The apparatus of claim 11, wherein, in response to the display devices corresponding to a multi-panel environment, the processor is configured to determine the second geometric correction information to set the output domain pixel coordinate system of the output image to be the panorama domain pixel coordinate system of the panoramic image.

14. The apparatus of claim 11, wherein the processor is configured to generate the LUT by determining an input domain pixel coordinate system of an input image corresponding to an output domain pixel coordinate system of an output image using at least one of Bezier correction, a homography matrix among cameras capturing the input image, a homography matrix between output domain pixel coordinates of the output image and panorama domain pixel coordinates of the panoramic image, and rotational transformation, and by mapping the determined input domain pixel coordinate system of the input image to the output domain pixel coordinate system of the output image.

\* \* \* \* \*

UNITED STATES PATENT AND TRADEMARK OFFICE
CERTIFICATE OF CORRECTION

PATENT NO.        : 9,870,601 B2
APPLICATION NO.   : 15/089993
DATED             : January 16, 2018
INVENTOR(S)       : Yong Ju Cho et al.

It is certified that error appears in the above-identified patent and that said Letters Patent is hereby corrected as shown below:

On the Title Page

Item [72], Replace "Muhammad MURTAZA, Islamabad (PK)" with --Muhammad Murtaza KHAN, Islamabad (PK)--

Signed and Sealed this
Twentieth Day of August, 2019

Andrei Iancu
*Director of the United States Patent and Trademark Office*